United States Patent Office 3,528,905
Patented Sept. 15, 1970

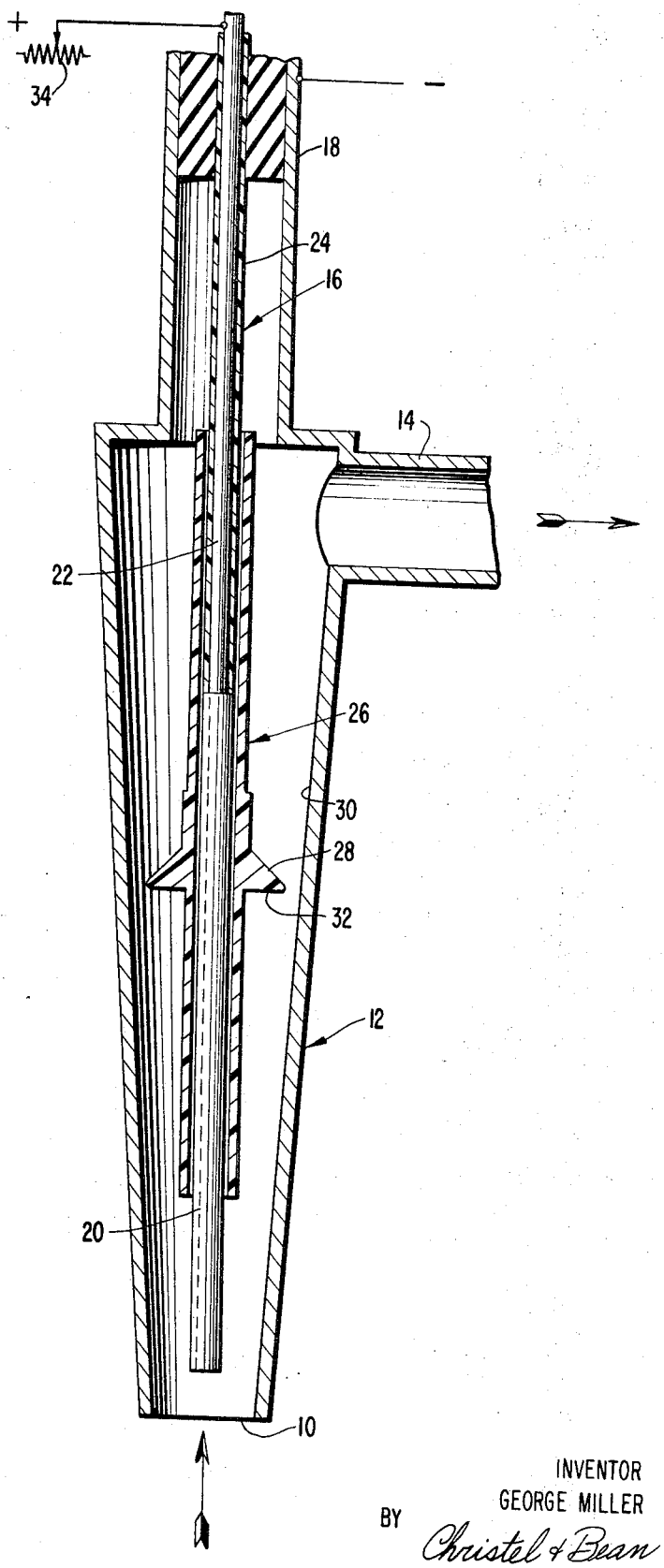

3,528,905
ELECTROLYTIC STERILIZATION
George Miller, Bogata, Colombia, assignor to Ethel C. Fornes, Springville, N.Y.
Filed Mar. 22, 1968, Ser. No. 715,230
Int. Cl. B01k 3/00, 3/04
U.S. Cl. 204—272                 8 Claims

ABSTRACT OF THE DISCLOSURE

The concentration of metallic ions electrolytically introduced into water for sterilization thereof is maintained substantially constant by automatically exposing more or less of the metallic electrode in response to the flow rate of water passing the electrode.

BACKGROUND OF THE INVENTION

Water sources conventionally contain a certain amount of bacteria or micro-organisms which are potential dangers to health or they may be conducive to the inception of various chemical reactions or micro-organism growth which are detrimental to some industrial processes. Chemical treatment of water to effect its sterilization is quite common place although it is in general expensive and may give rise to objectionable odor and/or taste.

It also has been proposed to provide means for introducing certain metallic ions into water for sterilization purposes and, to this end, several of the rare metals have been used. Such processes inherently possess the possibility of incurring considerable expense by the very nature of the materials used and additionally due to the complexity of the equipment normally employed to practice such a method of water sterilization.

BRIEF SUMMARY OF THE INVENTION

This invention relates to the electrolytic introduction of metallic ions into water for destroying bacteria and other micro-organisms therein, in which the apparatus employed is of simple and inherently economical nature. More particularly, the apparatus according to this invention is economical of the precious metal employed by reason of the fact that the system automatically adjusts to volumetric flow conditions in a simple and reliable manner so as closely to control the quantity of ionic introduction of the precious metal and maintain the same at a relatively fixed level, without resorting to complex and expensive control apparatus.

Specifically, this invention employs a metallic electrode positioned within a conduit or chamber through which the water to be treated passes. The chamber is of varying cross section and the electrode is provided with a masking device responsive to volumetric flow through the chamber automatically to vary the surface area of the electrode which is exposed and wetted by the water for introducing the metallic ions thereinto. Since the quantity of electrolytic introduction of metallic ions is proportional to the surface area exposed, the masking device is constructed so as to vary the exposure of the electrode in such fashion that the quantity of ionic introduction varies in proportion to the water flow rate thereby to maintain the density of ionic concentration substantially uniform. In this way, the apparatus is not wasteful of the electrode material since the ionic density may be adjusted and maintained at or near the minimum value which is effective to produce the desired results.

BRIEF DESCRIPTION OF THE DRAWINGS

The drawing is a longitudinal section taken through a device according to the present invention.

DETAILED DESCRIPTION OF THE INVENTION

A water inlet or supply line 10 is shown to be coupled to one end of the chamber 12 and adjacent the opposite end of the chamber is provided a water outlet line 14 which may lead to the point of ultimate consumption or use, not shown. The preferred chamber is of circular cross section which is of increasing area between the inlet and outlet ends thereof and centrally disposed within this region is an electrode device indicated generally by the reference character 16.

One end of the electrode device is secured to a suitable boss portion 18 of the chamber 16 and is adapted for removal and replacement as may be achieved by any conventional mounting arrangement. Additionally, provision is made for connecting the electrode device to a suitable source of electrical energy. The electrode device comprises a main body portion 20 adapted to be variably exposed to water flowing through the chamber and having a reduced diameter stem portion 22 projecting therefrom upwardly into the boss 18 and it is this stem portion to which electrical connection as aforesaid is made.

The stem 22 is encased within a tubular insulating sleeve 24 at least within that thereof exposed within the chamber 12 and the sleeve preferably extends into the boss 18 as shown. Cooperating with the insulating sleeve is the masking sleeve 26 which is of sufficient length completely to mask the main body portion 20 of the electrode under the condition of zero water flow through the chamber.

For this purpose, the masking sleeve is axially slidable on the electrode device and is provided with a flow sensitive reaction vane 28 which cooperates with the inclined inner surface 30 of the chamber automatically to position the masking sleeve along the electrode device to expose the necessary surface area of the main body portion 20 maintaining a constant density of metallic electrode ions in the water. Preferably, the vane 28 presents a downwardly facing annular reaction surface 32 disposed substantially normal to the direction of water flow.

It will be appreciated that the slope of the inner surface 30 acts in conjunction with the diameter of the vane 28 to raise the masking sleeve to a level, in response to a given flow condition, which exposes just that surface area of the main body portion 20 of the electrode below the lower end of the masking sleeve which will electrolytically introduce the required quantity of metallic ions into the water to maintain the ionic density constant for all water flow rates encountered and with a fixed electrical potential acting between the body of the chamber 12 and the electrode 16. In this way, not only will the consumption of the main body portion 20 be of minimum extent but the electrical energy source and its controls may be of the simplest nature. The electrical energy source preferably does include some simple means such as a potentiometer 34 for adjusting the electrical potential, both for calibration purposes and to accommodate for the fact that as the electrode main body 20 is consumed, its surface area per unit length is decreased somewhat. This latter factor can be reduced by making main body portion 20 a relatively thin-walled tube open at its lower end.

The preferred material for the electrode is silver although other metallic ions such as mercury ions are effective also. Stem 22 is of brass or other electrically conductive material, preferably of relatively low cost, and can be joined to main body portion 20 in any suitable, electrically conductive manner.

The micro-organisms which are to be destroyed are characterized by basic protein units having sulfide linkages. These linkages are for practical purposes polar bonds and if broken the micro-organisms will die. Thus, the degree to which these linkages may be broken depends upon the solubility product of the sulfide of the metallic electrode used. Since silver and mercury sulfides have low solubility products they are preferred. It is to be understood that various alloys including silver-copper and mercury-copper may be used as the electrodes in order to electrolytically introduce the preferred metallic ions. Masking sleeve 26 can be of synthetic plastic or other suitable material.

Tests to determine the effectiveness of the electrolytic introduction of metallic ions into water as a means of sterilization were conducted in raw water from the San Cristobal river in South America, the raw water having a recount of 160 bacterial colonies per cc. and positive coli bacillus index up to dilution of 0.1%. Significant sterilization activity is present with a silver ion concentration of as little as 0.001 p.p.m. whereas with a silver ion concentration of 0.1 p.p.m. bacteriological results were completely negative.

Other tests were conducted on raw water obtained from the La Palmara river, the raw water containing amoebas, Salmonella Shigella, fungus, Streptococcus, Staphylococcus, etc. With a silver ion concentration of 0.1 p.p.m. complete sterilization was effected, tests indicating negative results for all kinds of micro-organisms.

By connecting the electrode 20 as the anode and the chamber 12 as the cathode with the mean distance between them being 1 inch, a silver ion concentration of 0.01 p.p.m. may be achieved, per cubic meter of water per hour, by an exposed electrode area of 1.14 cm.$^2$ with a voltage potential of 110 volts and a current flow of 2.5 milliamperes. It is believed that this concentration will suffice, at least in most instances. However where a higher concentration is desired it can be achieved, as by increasing the current flow.

Obviously, the slope of the inner wall surface 30 and the flow responsive characteristics of the masking sleeve 26 are interdependent when the requirement for constant silver ion concentration over a wide range of flow rates is to be met. In many practical applications, the water flow may vary by a factor of ten or more and this condition may be accommodated simply by the provision of a main body portion 20 of sufficient length.

Obviously, many modifications and variations of the present invention are possible in the light of the above teachings. It is therefore to be understood that within the scope of the appended claims the invention may be practiced otherwise than as specifically described.

What is claimed is:

1. A device for sterilizing raw water and the like which may contain amoebas, bacteria and/or other micro-organisms, which comprises, a body defining a chamber having an inlet and an outlet spaced from each other along the length of the chamber, being of increasing cross-sectional area along its length between said inlet and said outlet, an electrode extending within said chamber in the region between said inlet and said outlet, and a masking sleeve slidably received on said electrode, said masking sleeve including means for shifting the sleeve with respect to the electrode in response to fluctuation of flow between said inlet and said outlet, thereby automatically to expose an increasing amount of the surface area of the electrode as flow through said chamber increases.

2. The sterilizing device according to claim 1 wherein said electrode comprises a metallic rod having a stem portion fixed to said body and a main body portion extending within said region, said main body portion being of enlarged diameter with respect to said stem, and an insulating sleeve surrounding said stem and effecting a continuation of the outer surface of said main body portion.

3. The sterilizing device as defined in claim 2 wherein said masking sleeve is of a length at least as great as the length of said main body portion of the electrode, and said stem being of a length within said chamber sufficient to allow movement of said masking sleeve therealong to expose a major portion of said main body portion.

4. The sterilization device as defined in claim 1 wherein said electrode has a predetermined length extending within said chamber, said masking sleeve having a length less than that of the electrode, and means permanently masking a portion of the stated length of the electrode.

5. The sterilization device as defined in claim 4 wherein the permanently masked portion of the electrode is confined substantially wholly beyond said outlet.

6. The sterilization device as defined in claim 5 wherein said electrode is a silver electrode.

7. The sterilization device as defined in claim 1 wherein said electrode is a silver electrode.

8. The sterilization device as defined in claim 1, wherein said electrode comprises a tubular body portion within said region, said body portion being open-ended at the end thereof adjacent said inlet.

References Cited

UNITED STATES PATENTS

| 2,415,067 | 1/1947 | Wallace | 204—195 |
| 2,764,540 | 9/1956 | Farin et al. | 204—140.5 |

OTHER REFERENCES

Wallace & Tiernan, Inc. advertisement, "Chemical Engineering," p. 222, Oct. 21, 1968.

HOWARD S. WILLIAMS, Primary Examiner

A. C. PRESCOTT, Assistant Examiner

U.S. Cl. X.R.

204—149, 222, 275